United States Patent
Yalagandula et al.

(10) Patent No.: US 9,420,513 B1
(45) Date of Patent: Aug. 16, 2016

(54) CLUSTERING APPROACH TO ESTIMATING A NETWORK METRIC FOR NODES

(75) Inventors: Praveen Yalagandula, Redwood City, CA (US); Sujata Banerjee, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1710 days.

(21) Appl. No.: 11/767,151

(22) Filed: Jun. 22, 2007

(51) Int. Cl.
| | |
|---|---|
| H04W 40/00 | (2009.01) |
| H04W 24/00 | (2009.01) |
| H04L 12/701 | (2013.01) |
| H04L 12/729 | (2013.01) |
| H04L 12/721 | (2013.01) |
| H04L 12/26 | (2006.01) |
| H04W 40/02 | (2009.01) |

(52) U.S. Cl.
CPC ............. *H04W 40/00* (2013.01); *H04L 12/26* (2013.01); *H04L 45/00* (2013.01); *H04L 45/125* (2013.01); *H04L 45/127* (2013.01); *H04W 24/00* (2013.01); *H04W 40/02* (2013.01)

(58) Field of Classification Search
CPC ..... H04W 40/00; H04W 24/00; H04W 40/02; H04L 45/127; H04L 45/125; H04L 45/00; H04L 12/26
USPC .............. 370/229, 235, 237–238.1, 254, 351, 370/389, 395.1, 395.4, 395.41
See application file for complete search history.

(56) References Cited

U.S. PATENT DOCUMENTS

| | | | | |
|---|---|---|---|---|
| 6,621,798 | B1 * | 9/2003 | Krishnan et al. | 370/256 |
| 7,177,295 | B1 * | 2/2007 | Sholander et al. | 370/338 |
| 2003/0117966 | A1 * | 6/2003 | Chen | 370/255 |
| 2003/0186651 | A1 * | 10/2003 | Weston et al. | 455/39 |
| 2003/0202468 | A1 * | 10/2003 | Cain et al. | 370/229 |
| 2003/0204623 | A1 * | 10/2003 | Cain | 709/241 |
| 2004/0213159 | A1 * | 10/2004 | Helgesen | 370/238 |
| 2006/0050634 | A1 * | 3/2006 | Gous | 370/229 |
| 2007/0211637 | A1 * | 9/2007 | Mitchell | 370/238 |

FOREIGN PATENT DOCUMENTS

WO          WO 03058868 A2 *  7/2003

OTHER PUBLICATIONS

Calvert, K. et al., "Modeling Internet Topology", IEEE Communications Magazine, vol. 35, No. 6, p. 160-163, Jun. 1997.
Castro, M. et al., "Scribe: A Large-Scale and Decentralized Application-Level Multi-Cast Infrastructure", IEEE Journal on Selected Areas in Communications, vol. 20, No. 8, pg.
Chen, B. et al., "L+: Scalable Landmark Routing and Address Lookup for Multi-Hop Wireless Networks", MIT LCS, Tech, Mar. 2002.

(Continued)

*Primary Examiner* — Obaidul Huq
(74) *Attorney, Agent, or Firm* — Mannava & Kang, P.C.

(57) ABSTRACT

A clustering-based method of estimating a network metric between a first node and a second node includes determining source clusters of nodes and destination clusters of nodes for each node. Cluster heads are selected for each cluster. Measurements of the network metric between each node and each cluster head for the source clusters and destination clusters are performed, and the network metric for a pair of nodes is estimated based on the measurements for the pair of nodes.

23 Claims, 4 Drawing Sheets

(56) References Cited

OTHER PUBLICATIONS

Chu, Y. et al., "A Case for End System Multicast", IEEE Journal on Selected Areas in Communications, vol. 20, No. 8, p. 1456-1471, Oct. 2002.
Duan, Z. et al., "Service Overlay Networks: SLAs, QoS and Bandwidth Provisioning",ICNP, Nov. 2002, p. 334-343.
Francis, P. et al., "IDMaps: A Global Internet Host Distance Estimation Service", IEEE/ACM Transactions on Networking, vol. 9, No. 5, p. 525-540, Oct. 2001.
Fu, X. et al., "CANS: Composable, Adaptive Network Services Infrastructure", USITS, San Francisco, CA, Mar. 2001.
Gummadi, K.P. et al., "King: Estimating Latency Between Arbitrary Internet End Hosts", IMW, France, Nov. 2002, p. 5-18.
Ng, T.S.E. et al., "Predicting Internet Network Distance With Coordinates-Based Approaches", IEEE Infocom, NY, Jun. 2002.
Pei, G. et al., "LANMAR: Landmark Routing for Large Scale Wireless Ad Hoc Networks with Group Mobility", MobiHoc, Boston, MA, Aug. 2000, p. 11-18.
"Performance Measurement Tools Taxonomy", http://www.caida.org/tools/taxonomy/performance.xml, Oct. 2004.
Ratnasamy, S. et al., "Topologically-Aware Overlay Construction and Server Selection", IEEE INFOCOM, NY, Jun. 2002.
Theilmann, W. et al., "Dynamic Distance Maps of the Internet", IEEE INFOCOM, Tel Aviv, Isreal, Mar. 2000, p. 275-284.
"Tools for Bandwidth Estimation", http://www.icir.org/models/tools.html, Mar. 2004.
Tsuchiya, P.F., "The Landmark Hierarchy: A New Hierarchy for Routing in Very Large Networks", SIGCOMM, Stanford, CA, Aug. 1988, p. 35-42.
Xu, D. et al., "Finding Service Paths in a Media Service Proxy Network", MMCN, San Jose, CA, Jan. 2002.
Zhao, B.Y. et al., "Brocade: Landmark Routing on Overlay Networks", IPTPS 2002, Cambridge, MA, Mar. 2002.
Zhuang, S.Q. et al., "Bayeux: An Architecture for Scalable and Fault-Tolerant Wide-Area Data Dissemination", NOSSDAV, Port Jefferson, NY, Jun. 2001.
Ningning Hu, Peter Steenkiste, Exploiting Internet Route Sharing for Large Scale Available Bandwith Estimation (2005).
Lee, S. et al., "Measuring Bandwidth Between PlanetLab Nodes", Hewlett-Packard Laboratories, Palo Alto, CA, downloaded Apr. 27, 2006.
Prasad, R. S. et al., "Bandwidth Estimation: Metrics, Measurement Techniques, and Tools", downloaded Apr. 27, 2006.
Ribeiro, V. J. et al., "Locating Available Bandwidth Bottlenecks", Sep.-Oct. 2004, IEEE Computer Society, IEEE Internet Computing.
S3 Scalabe Sensing Service, http://networking.hpl.hp.com/s-cube/, downloaded Apr. 27, 2006.
Savage, S. et al., "The End-to-End Effects of Internet Path Selection", downloaded Apr. 27 2006.
Strauss, J. et al., "A Measurement Study of Available Bandwidth Estimation Tools", IMC'03, Oct. 27-29, 2003, Miami Beach, FL, 2003 ACM.
Wong, B. et al., "Meridian: A Lightweight Network Location Service Without Virtual Coordinates", SIGCOMM'05, Aug. 21-26, 2005, Philadelphia, PA, 2005 ACM.
Xu, Z. et al., "Netvigator: Scalable Network Proximity Estimation", HP Laboratories Palo Alto, HPL-2004-28, Mar. 3, 2005, Internal Accession Date Only.
Zhu, Y. et al., "Dynamic Overlay Routing Based on a Available Bandwidth Estimation: A Simulation Study", downloaded Apr. 27, 2006.
Anderson, D. et al., "Resilient Overlay Networks", MIT Laboratory for Computer Science, downloaded Apr. 27, 2006.
Cha, M. et al., "Placing Relay Nodes for Intra-Domain Path Diversity", downloaded Apr. 27, 2006.
Dovrolis, C. et al., "Packet Dispersion Techniques and Capacity Estimation", Infocom 2001, USENIX.
Fei, T. et al., "How to Select a Good Alternate Path in Large Peer-to-Peer Systems?", downloaded Apr. 27, 2006.
Fonseca, R. et al., "Distributed Querying of Internet Distance Information", downloaded Apr. 27, 2006.
Gummadi, K. et al., "Improving the Reliability of Internet Paths with One-Hop Source Routing", downloaded Apr. 27, 2006.
Hu, N. et al., "Locating Internet Bottlenecks: Algorithms, Measurements, and Implications", Apr. 27, 2004, CMU-CS-04-123.
Jain, M. et al., "Pathload: A Measurement Tool for End-to-End Available Bandwidth", downloaded Apr. 27, 2006.
Kapoor, R. et al., "CapProbe: A Simple and Accurate Capacity Estimation Technique", SIGCOMM'04, Aug.30-Sep.3, 2004, Portland Oregon, 2004 ACM.
Katti, S. et al, "MultiQ: Automated Detection of Multiple Bottleneck Capacities Along a Path", IMC'04, Oct. 25-27, 2004, Sicily, Italy, 2004 ACM.

\* cited by examiner

CLUSTERING APPROACH TO ESTIMATING A NETWORK METRIC FOR NODES

BACKGROUND

Large networks, such as the Internet, provide the infrastructure for many peer-to-peer systems and are now being used to provide a variety of services to users. Some recent Internet applications require high bandwidth. Live, high-quality, streaming video, video conferencing, and graphic-intensive multiplayer games are examples of high-bandwidth applications.

A fundamental challenge in effectively utilizing high-bandwidth network services is to provide these services and other data transmission without affecting the quality of the services. Quality of Service (QoS) routing is a major factor in providing these services. However, selecting routes that provide the performance required by the service is difficult.

Accurately measuring metrics for computing network routes can be difficult. This is especially true when determining bandwidth. Measuring bandwidth is a computational and resource intensive process. It is difficult to conduct bandwidth measurements for large networks, such as the Internet, having a large number of paths. Measuring simultaneously on multiple paths may cause interference to measurement tools and may generate cross traffic, thus making it difficult to get accurate measurements in real-time. Furthermore, bandwidth changes quite rapidly and the measurements need to be updated frequently. In a large network, continuously measuring bandwidth would be infeasible because of the large measurement overhead.

SUMMARY

A clustering-based method of estimating a network metric between a first node and a second node includes determining source clusters of nodes and destination clusters of nodes for each node. Cluster heads are selected for each cluster. Measurements of the network metric between each node and each cluster head for the source clusters and destination clusters are performed, and the network metric for a pair of nodes is estimated based on the measurements for the pair of nodes.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to embodiments described herein, efficient and scalable estimation of available bandwidth for an end-to-end path is provided. In one embodiment, a clustering-based approach is used to estimate available bandwidth, where only a few measurements from each node are needed to estimate available bandwidth for any pair of nodes in the network. The clustering-based approach includes, for each node, dividing all other nodes in the network into two different sets of clusters. The two sets of clusters are source clusters and destination clusters. There are k1 number of clusters in source clusters set and k2 number of clusters in destination clusters set. A cluster head is selected for each cluster, which is a representative node from each cluster. Each node may store an identifier or address for each cluster head for each source and destination cluster, or this information may be stored in a central location.

Based on the stored information for each node, available bandwidth may be estimated for any pair of nodes in the network. For example, available bandwidth is measured to or from each of the pair nodes to cluster heads for relevant source and destination clusters for each of the pair of nodes. Then, available bandwidth is estimated based on the measurements. Using this technique to estimate available bandwidth, only a few available bandwidth measurements from the end hosts, which are the pair of nodes for which available bandwidth is being estimated, are needed. Also, in addition to available bandwidth, other network metrics may be estimated using this technique, including capacity and loss rate.

The clustering-based approach of the embodiments described herein may be used to estimate available bandwidth between a set of end hosts that are known in advance, which are the pair of nodes for which available bandwidth is being estimated. This scenario arises in many distributed applications with a set of servers that can leverage the bandwidth information between all pairs of nodes to optimize certain functionalities. For example, in a content distribution network where content needs to be distributed to different servers, we can utilize the bandwidth information to choose the synchronization paths that reduce the total transfer time. Also, the knowledge of available bandwidth between end-hosts may be used for optimizing the performance in several applications such as media-streaming systems, content distribution networks, interactive audio-video systems, and online-gaming systems. For example, in a media streaming system, the available bandwidths from a client to a set of media servers that hold the same content can be used to select a suitable server for providing the content to the client at the bandwidth needed for the high-quality media streaming. Similarly, the available bandwidth from a server to a client can be used in online gaming systems to select the quality of the gaming graphics.

After the available bandwidth between a pair of nodes is estimated, the available bandwidths may be stored, displayed or conveyed to a user or another node in the network. The available bandwidths may be used to select a path for transmitting data to a destination. In one example, the available bandwidth is used to select a path that meets the requirements for providing a service. For example, a service provided to a user over a network, such as the Internet, may require a minimum available bandwidth. A path is selected in the network that has an available bandwidth greater than or equal to the required minimum available bandwidth. Other network metrics, such as latency, throughput, loss rate, etc., in addition to available bandwidth, may be considered when selecting a path.

As used herein capacity is the maximum transmission rate of a data transmission on a link or an end-to-end path, assuming the data transmission has full access to the link or path without any other network traffic on the link or path.

Available bandwidth is the transmission rate of a data transmission on a link or path with other network traffic on the link or path. The network traffic typically varies over time, so the available bandwidth varies over time and is generally less stable than capacity.

An end-to-end path in a network between a source node and a destination node, also referred to as a path or network path, may be comprised of one or more links. The available bandwidth or capacity of a path comprised of multiple links may be characterized by the link in the path having the lowest capacity or lowest available bandwidth. This link may be referred to as the bottleneck link.

Figure 1:
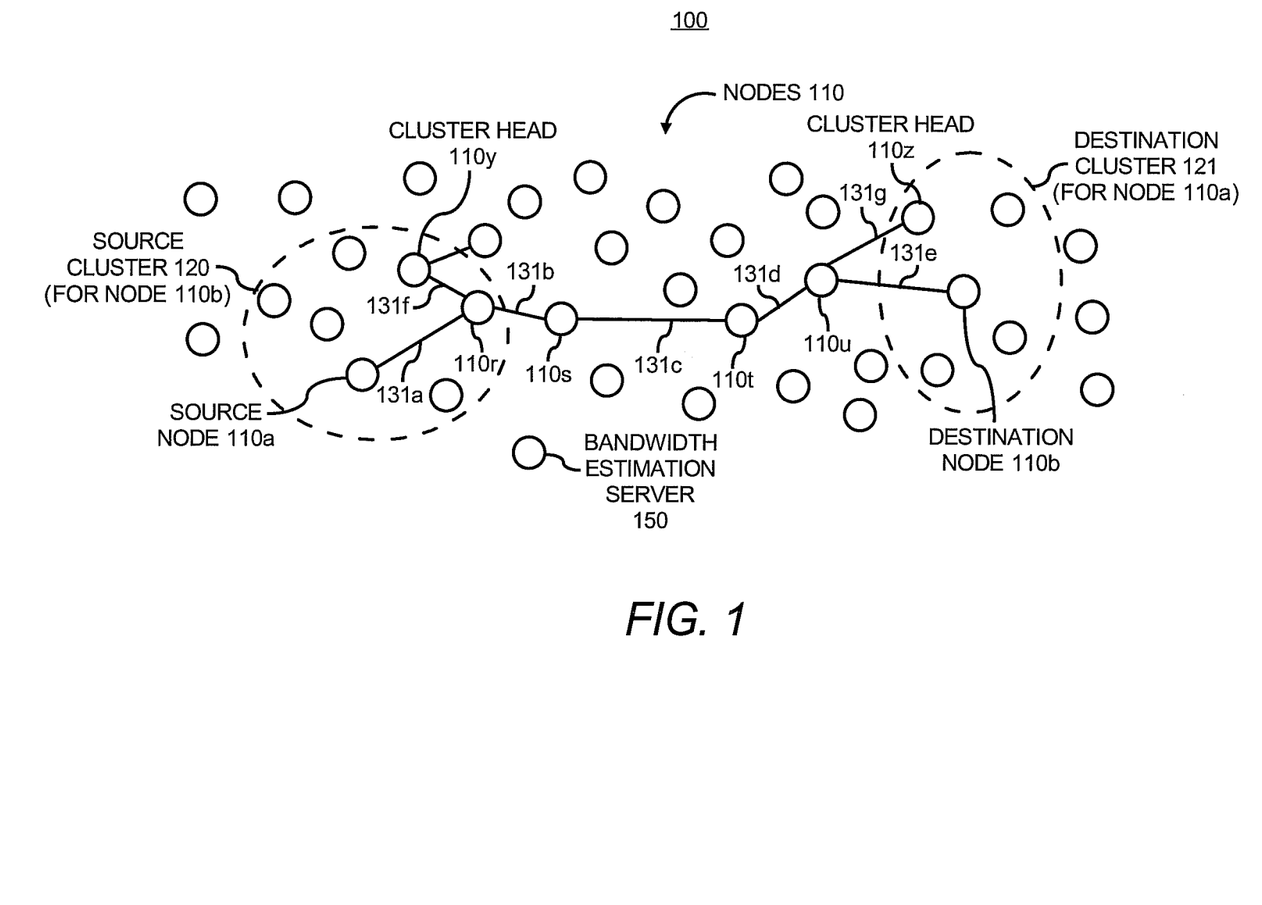
FIG. 1 illustrates a network including nodes, according to an embodiment.

FIG. 1 illustrates a network 100 including nodes. An example of the network 100 includes a large-scale network, such as the Internet. However, the embodiments may be implemented in smaller networks.

A node is any device that may send and/or receive messages via the network and that is typically operable to perform some type of data processing. Examples of nodes include routers, servers, and end-user devices, such as personal digital assistants (PDAs), personal computers, laptops, and cellular phones. The nodes 110 may be operable to route data in the network 100 along network paths. The nodes may include intermediate routers, which are routers in a path between end hosts.

According to an embodiment, available bandwidth is estimated for end hosts in the network 100, which are a pair of the nodes 110. Typically, this includes servers and clients, which may be receiving content or services, such as streaming media, on-line gaming, etc., from the servers, but other types of nodes may be end hosts.

For each of the nodes 110 that may be used as end hosts, all other nodes are divided into source and destination clusters. Thus, each of the nodes 110 has a set of source clusters and destination clusters comprised of all the other nodes in the network 100. A k1 number of source clusters and a k2 number of destination clusters may be determined, where k1 and k2 are predetermined numbers and could be independently chosen by each node depending on some metric, such as its current load, etc. For the sake of simplicity, we assume that k1=k2=k in the embodiments described below. A clustering function, described in detail below, is used to determine the source and destination clusters for each node 110.

FIG. 1 shows a pair of nodes including source nodes 110a and destination node 110b. A destination cluster 121 is shown for the source node 110a. However, the source node 110a may have k destination clusters and k source clusters where k is greater than 1, even though those clusters are not shown. A source cluster source 120 is shown for the destination node 110b. However, the destination node 110b may have k source clusters and k destination clusters where k is greater than 1, even though those clusters are not shown.

A cluster head is selected for each cluster of the source clusters and destination clusters for each node. For example, a node 110y is the cluster head for the source cluster 120, and a node 110z is a cluster head for the destination cluster 121. For each node, a network metric is measured from the node to each of the cluster heads for the node's destination clusters and a network metric is measured to the node from each of the cluster heads for the node's source clusters. For example, the source node 110a measures available bandwidth from itself to the cluster head 110z, and stores the measured available bandwidth for the cluster, which is the destination cluster 121. FIG. 1 shows an example of a path between the source node 110a and the cluster head 110z including nodes 110r-u and links 131a-d and 131g. The available bandwidth may be measured along this path using conventional techniques. Furthermore, well known measurement techniques for measuring available bandwidth, loss rate, capacity or other network metrics may be used.

Available bandwidth is also measured between the source node 110a and all the other cluster heads for all the other k destination clusters and all the k source clusters for the source node 110a. These measurements are stored, for example, locally in the node 110a and/or in a central location, such as the bandwidth estimation server 150.

Available bandwidth is also measured between the destination node 110b and all the cluster heads for all the k destination clusters and all the k source clusters for the destination node 110b. These measurements are stored, for example, locally in the node 110b and/or in a central location, such as the bandwidth estimation server 150. An example of a path between the destination node 110b and the cluster head 110y for the source cluster 120 for the destination node 110b is shown. The path includes nodes 110u, 110t, 110s and 110r, and links 131e, 131d, 131c, 131b, and 131f.

Available bandwidth may be estimated between the source node 110a and the destination node 110b based on the stored measurements. For example, a path between the source node 110a and 110b is shown, including nodes 110r-u and links 131a-e. Available bandwidth on this path is estimated based on the available bandwidth measurements between the source node 110a and the k cluster heads for each of the k source and destination clusters for the node 110a and based on the available bandwidth measurements between the destination node 110b and the k cluster heads for each of the k source and destination clusters for the node 110b. In particular, according to an embodiment, a cluster is identified for each of the nodes 110a and 110b that the other node is a member of, and the available bandwidth measurements for those clusters are used to estimate available bandwidth for the node pair.

For example, a destination cluster for the source node 110a is identified of which the destination node 110b is a member, i.e., the destination cluster 121. The available bandwidth measurement from the source node 110a to the cluster head 110z for the destination cluster 121 is determined. Also, a source cluster for the destination node 110b is identified of which the source node is a member, i.e., the source cluster 120. The available bandwidth measurement to the destination node 110b from the cluster head 110y for the source cluster 120 is determined. The minimum of these measurements may be used as the estimation of available bandwidth for the path between the pair of nodes 110a and 110b.

The network metric measurements, which in this example are available bandwidth measurements, for all the nodes 110 may be measured periodically and stored in the bandwidth estimation server 150. Then, the server 150 may be queried to estimate available bandwidth for any pair of nodes based on the stored measurements. Instead of a single server 150, a distributed storage and estimation system comprised of multiple servers in the network 100 may be used to store and estimate network metrics for a large-scale network. Other distributed solutions may also be used. In another embodiment, the nodes may be queried for their measured available bandwidths to cluster heads and the requesting node may estimate the available bandwidth. For example, a node in the system 100 needs to determine the available bandwidth between the source node 110 and the destination node 110*b*. The node queries the node 110*a* for the measured available bandwidth to the cluster head 110*z*, and the node queries the node 110*b* for the measured available bandwidth to the cluster head 110*y*. Then, the node estimates the available bandwidth between the source node 110*a* and the destination node 110*b*. In yet another embodiment, one of the nodes taking a measurement may query the other node for its measurement to estimate available bandwidth. For example, the source node 110*a* may query the destination node 110*b* for the measured bandwidth to the cluster head 110*y*, and then the source node calculates an estimation of available bandwidth between the two nodes based on the measured metric.

As described above, for a given node in the network 100, all other nodes are divided into source clusters and destination clusters for that node. In one embodiment, for a given node, each of the other nodes in the system may belong to only one source cluster and one destination cluster.

According to an embodiment, nodes that share a similar property with respect to network metric measurements from or to the given node are selected for the same cluster. For source clusters, we divide nodes based on their properties while measuring to the given node and for destination clusters, we divide nodes based on their properties as measured from the given node. For example, path similarity, in terms of the same hops or links, may be leveraged as a property to perform the clustering. For the source node 110*a*, all paths from all the other nodes or a subset of all the other nodes in the network 100 are considered. These paths are referred to as source paths. Since end-hosts are typically connected to the Internet via few service providers, mostly one, most source paths will share some hops with other source paths. This property is leveraged to divide nodes into clusters such that nodes in a cluster share last few hops on their source paths to the source node 110*a*. Those nodes may be clustered into a single source cluster of k source clusters formed for the source node 110*a*. k may be a small number such as 1-4, but k may be larger. Similarly, k destination clusters are formed by considering all paths, i.e., destination paths, from the source node 110*a* to all the other nodes. All the other nodes are clustered such that the nodes in a cluster share first few hops from the node 110*a*. For example, the destination cluster 121 for the source node 110*a* is shown. The nodes in the destination cluster 121 all share at least the first few hops in their destination paths from the node 110*a*.

According to an embodiment, a clustering function uses path similarity and network topology information to form clusters. To determine the network topology, each node may perform traceroutes to all other nodes in the network 100 to determine all the intermediate nodes in all the paths. Traceroutes use a few small-sized packets to determine intermediate nodes and links in paths. Also, the topology of the network 100 may change slowly and is not as dynamic as available bandwidth. So, traceroutes may be periodically performed at a much slower rate than available bandwidth measurements to update the network topology information. The traceroute information may be transmitted to the server 150 to determine the network topology.

A tree-clustering function may be used to form the clusters. For example, the server 150 constructs a traceroute tree representative of the network topology for each of the nodes 110 from the traceroutes performed for each node. In another embodiment, instead of the server 150 constructing the traceroute tree, each node constructs its own tree and determines the clusters.

After constructing the tree for each node, the tree is traversed to create k source clusters or k destinations clusters. To create destination clusters, a number of children from the root of the tree is determined. Also, a number of leaves in each of the subtrees of the children are determined. Then, k is divided among each of the children based on the number of leaves in the subtree of the children. If a number of leaves is greater for one subtree, then that subtree gets more clusters. The number of clusters assigned to each child of the root may be proportional to the number of leaves in the subtrees for each child when dividing k among the children. To ensure that the divided numbers are integers, the numbers are rounded to the nearest integer while ensuring that the total is k. If the calculated portion of k to be assigned to a subtree is less than one, then that subtree may be given one cluster. If the portion of k for a subtree is greater than one, then these steps are repeated at the subtree's root with the nearest integer of the fraction as the new k.

Figure 2:
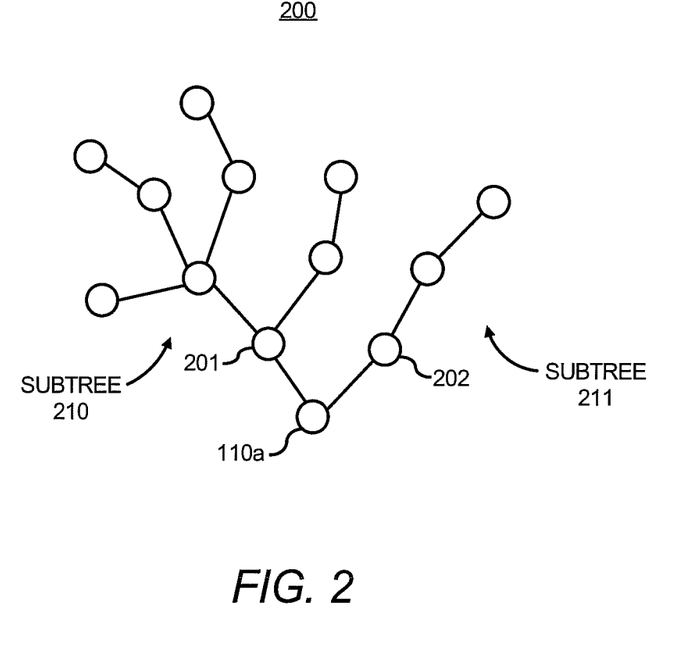
FIG. 2 illustrates a traceroute tree, according to an embodiment.

FIG. 2 shows an example of a tree for the source node 110*a*. The tree root, which is the source node 110*a*, has two children 201 and 202. Note that the subtree 210 for the child 201 has more leaves then the subtree 211 for the child 202. If k=3, then dividing k among the children based on the number of leaves in each subtree may result in the child 201 having k=2 destination clusters and the child 202 having k=1 destination cluster. That is the nodes in the subtree 210 are divided into 2 clusters, and the nodes in the subtree 211 become members of a single cluster. Because the portion of k for the subtree 210 is greater than one, i.e., 2, the clustering steps described above are repeated at the subtree's root, which is 201, with the nearest integer of the portion of k as the new k. In this example, each subtree of the node 201 may be assigned to 1 cluster. This same procedure is repeated to determine source clusters for the node 110*a*. The tree for determining the source clusters may be created from traceroute packets transmitted to the node 110*a* from all other nodes in the network. Also, source clusters and destination clusters may be formed for each node 110.

After the source and destination clusters are formed for each node, cluster heads are selected. The cluster heads may be selected as a representative of all the nodes in the cluster in terms of the network metric being estimated. Cluster heads may be selected based on one or more properties, such as a least loaded node, a node with large incoming or outgoing network capacity, or a node with large incoming or outgoing available bandwidth. The accuracy of the estimation of the network metric is affected by the cluster head selection policy. Thus, a cluster head having properties maximizing the accuracy of the network metric estimation is selected.

In one embodiment, a node in a cluster having a maximal capacity is selected as the cluster head. The capacity is the end-to-end capacity of the path between the cluster head and the source or destination node.

For available bandwidth estimation using the minimum logic, a cluster heads is selected such that the bottlenecks of a path between a source or destination node and the cluster head does not lie close to the cluster head. For a source cluster of a destination node, a cluster head is selected such that the capacity from the cluster head to the destination node is greater than the capacity from any other node in the cluster to the destination node. Similarly, for a destination cluster of a source node, a cluster head is selected such that the capacity from the source node to the cluster head is greater than the capacity from the source node to any other nodes in the cluster. This step requires information about the capacity between nodes. Note that the capacities are not highly dynamic metrics and hence it is feasible to monitor all pair capacities and use it for this purpose.

Figure 3:
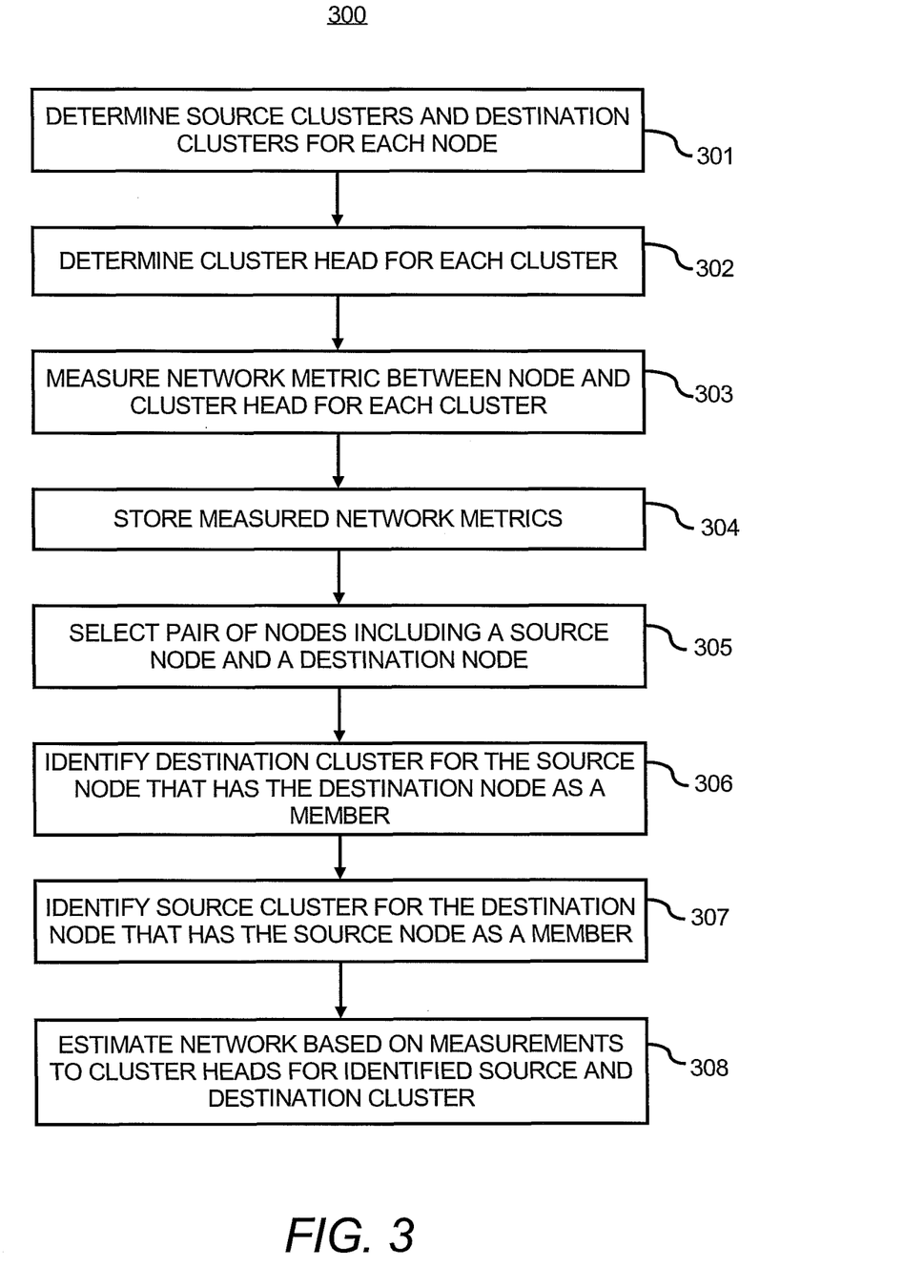
FIG. 3 illustrates a flow chart of a method for estimating a network metric, according to an embodiment.

FIG. 3 illustrates a method for estimating a network metric using a clustering approach, according to an embodiment. Examples of the network metric include but are not limited to available bandwidth, capacity, and loss rate. FIG. 3 is described with respect to FIGS. 1 and 2 by way of example and not limitation.

At step 301, source clusters and destination clusters are determined for each node of a plurality of nodes in the network 100 shown in FIG. 1. For each node, clustering may be based on path similarities for paths between the node and other nodes in the network 100. In the embodiment described with respect to FIG. 2, a network topology is determined, such as a traceroute tree for each node, and clustering is performed based on the tree. The clustering is performed to determine k source clusters and k destination clusters for each node.

At step 302, a cluster head is determined for each cluster for each node. The cluster head may be selected such that the cluster head is representative of all the nodes in the cluster in terms of a network property. In one embodiment, capacity is used to select the cluster head. The cluster head may be selected such that a bottleneck link is not close to the cluster head.

At step 303, each node measures the network metric between itself and the cluster heads for each of the source clusters and destination clusters for the node. If the network metric is available bandwidth, then available bandwidth is measured between the node and the cluster heads for the clusters for the node.

At step 304, the measured network metrics for each node are stored, for example, in the bandwidth estimation server 150. Each node may transmit the measured network metrics to the bandwidth estimation server 150 for storage. Measurements may be performed and stored periodically.

At step 305, a pair of nodes, including a source node and a destination node, are selected for estimating the network metric. For example, available bandwidth needs to be determined for a path between the source node 110a and the destination node 110b. These nodes are the pair of selected nodes.

At step 306, a destination cluster for the source node is identified that has the destination node as a member. For example, a destination cluster for the source node 110a is identified of which the destination node 110b is a member, i.e., the destination cluster 121. The available bandwidth measurement from the source node 110a to the cluster head 110z for the destination cluster 121 is determined from the stored measurements.

At step 307, a source cluster for the destination node is identified that has the source node as a member. For example, a source cluster for the destination node 110b is identified of which the source node is a member, i.e., the source cluster 120. The available bandwidth measurement from the destination node 110b to the cluster head 110y for the source cluster 120 is determined from the stored measurements.

At step 308, the network metric is estimated for the pair of nodes based on the stored measurements for the cluster heads of the identified clusters. In one embodiment, the minimum of the available bandwidth measurement from the source node 110a to the cluster head 110z for the destination cluster 121 and the available bandwidth measurement from the destination node 110b to the cluster head 110y for the source cluster 120 is the estimation of the available bandwidth for the pair of nodes.

One or more of the steps described above may be performed by the bandwidth estimation server 150 and/or each of the nodes to estimate the network metric.

Figure 4:
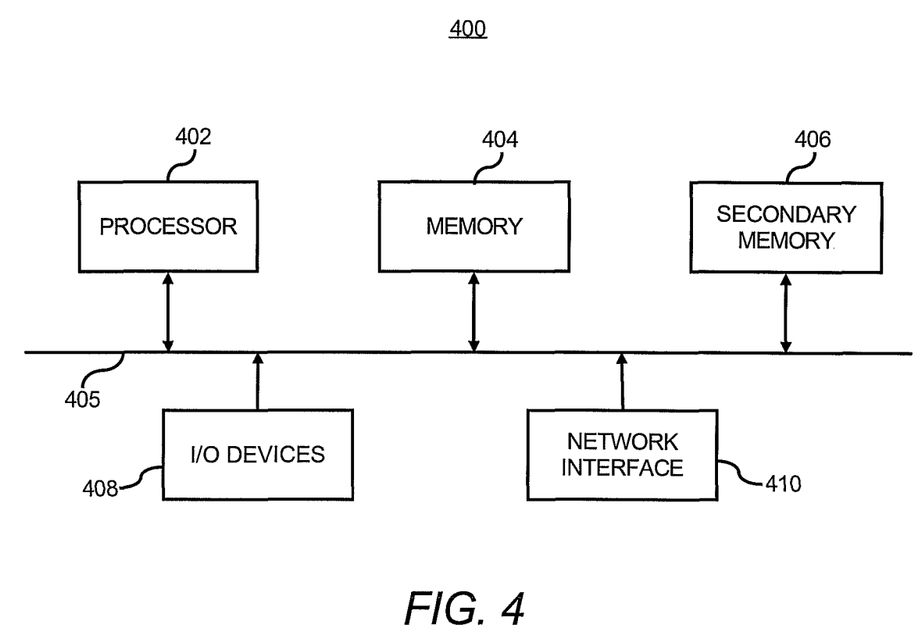
FIG. 4 illustrates a computer system, according to an embodiment.

FIG. 4 illustrates an exemplary block diagram of a computer system 400 that may be used as a node in the network 100 or as the bandwidth estimation server 150. The computer system 400 includes one or more processors, such as processor 402, providing an execution platform for executing software.

Commands and data from the processor 402 are communicated over a communication bus 405. The computer system 400 also includes a main memory 404, such as a Random Access Memory (RAM), where software may be resident during runtime, and a secondary memory 406. The secondary memory 406 includes, for example, a hard disk drive and/or a removable storage drive, representing a floppy diskette drive, a magnetic tape drive, a compact disk drive, etc., or a nonvolatile memory where a copy of the software may be stored. The secondary memory 406 may also include ROM (read only memory), EPROM (erasable, programmable ROM), EEPROM (electrically erasable, programmable ROM). In addition to software for routing and other steps described herein, routing tables, network metrics, and other data may be stored in the main memory 404 and/or the secondary memory 406. The memories 404 and/or 406 may store the network metric measurements, node IDs for cluster heads and clusters, etc.

A user interfaces with the computer system 400 with one or more I/O devices 408, such as a keyboard, a mouse, a stylus, display, and the like. A network interface 410 is provided for communicating with other nodes in the network 100.

One or more of the steps of the method 300 and other steps described herein may be implemented as software embedded on a computer readable medium, such as the memory 404 and/or 406, and executed on the computer system 400, for example, by the processor 402. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the scope of the claimed embodiments.

What is claimed is:

1. A clustering-based method of estimating a network metric for a pair of nodes of a plurality of nodes in a network, the method comprising:

for each of the plurality of nodes, determining source clusters of nodes and destination clusters of nodes;

selecting a cluster head for each cluster;
storing measurements of the network metric between each node of the plurality of nodes and each cluster head for the source clusters and destination clusters for the node; and
estimating, by a processor, the network metric for the pair of nodes of the plurality of nodes based on the measurements of the network metric for the pair of nodes,
wherein for each of the plurality of nodes, determining source clusters of nodes and destination clusters of nodes comprises:
  for each node, performing traceroutes from the node to all other nodes of the plurality of nodes to determine paths to the all other nodes, wherein the paths include intermediate routers;
  determining a traceroute tree comprised of the determined paths; and
  determining k1 source clusters and k2 destination clusters based on a number of children from a root node in the tree and a number of leaves in subtrees for the children.

2. The method of claim 1, wherein estimating a network metric for a pair of nodes of the plurality of nodes based on the stored measurements of the network metric for the pair of nodes comprises:
  determining the measured network metric from a source node of the pair of nodes to the cluster head of the destination cluster including a destination node of the pair of nodes;
  determining the measured network metric from the cluster head of the source cluster including the source node of the pair of nodes to the destination node; and
  determining a minimum of the measured network metric from the source node of the pair of nodes to the cluster head of the destination cluster and the measured network metric from the cluster head of the source cluster to the destination node, wherein the minimum is the estimation of the available bandwidth for the pair of nodes.

3. The method of claim 1, wherein determining destination clusters of nodes further comprises:
  for each node of the plurality of nodes, determining destination paths to all other nodes of the plurality of nodes;
  from the destination paths, determining paths with shared hops; and
  placing nodes in a same destination cluster based on a number of shared hops in the destination paths.

4. The method of claim 3, wherein determining source clusters of nodes further comprises:
  for each node of the plurality of nodes, determining source paths from all other nodes of the plurality of nodes to the node;
  from the source paths, determining paths with shared hops; and
  placing nodes in a same source cluster based on a number of shared hops in the source paths.

5. The method of claim 1, comprising:
  dividing k among the children of the root in a same ratio as the number of leaves in each subtree to determine a portion of the k clusters assigned to each child of the root.

6. The method of claim 5, comprising:
  if k is greater than one for a child of the root, then assigning a portion of k to each subtree of the child based on a number of leaves in each subtree of the child.

7. The method of claim 1, wherein selecting a cluster head for each destination cluster comprises:
  for each of the plurality of nodes, determining capacities from the node to each node in the destination clusters;
  identifying a maximal capacity for each destination cluster from the determined capacities; and
  selecting a node in each destination cluster having the maximal capacity as the cluster head.

8. The method of claim 1, wherein selecting a cluster head for each source cluster comprises:
  for each of the plurality of nodes, determining capacities from each node in the source clusters to the node;
  identifying the maximal capacity for each source cluster from the determined capacities; and
  selecting a node in each source cluster having the maximal capacity as the cluster head.

9. The method of claim 1, wherein the network metric comprises one of available bandwidth, capacity and loss rate.

10. The method of claim 1, wherein the source clusters and the destination clusters for the plurality of nodes are different clusters.

11. A method of estimating available bandwidth for a pair of nodes of a plurality of nodes in a network, wherein the pair of nodes includes a source node and a destination node, the method comprising:
  for each of the plurality of nodes, determining source clusters of nodes and destination clusters of nodes;
  determining cluster heads for each of the source clusters;
  determining cluster heads for each of the destination clusters; and
  estimating, by a processor, available bandwidth for the pair of nodes based on bandwidth measurements between the pair of nodes and the cluster heads,
  wherein for each of the plurality of nodes, determining the source clusters of nodes and destination clusters of nodes comprises:
    for each corresponding node, performing traceroutes from the node to all other nodes of the plurality of nodes to determine paths to the all other nodes, wherein the paths include intermediate routers;
    determining a traceroute tree comprised of the determined paths;
    determining k1 source clusters and k2 destination clusters based on a number of children from a root node in the tree and a number of leaves in subtrees for the children.

12. The method of claim 11, wherein estimating available bandwidth for the pair of nodes comprises:
  measuring a first available bandwidth from the source node to the cluster head of the destination cluster for the source node, wherein the destination cluster includes the destination node from the pair of nodes;
  measuring a second available bandwidth from the cluster head of the source cluster for the destination node to the destination node, wherein the source cluster includes the source node from the pair of nodes; and
  determining a minimum of the first available bandwidth and the second available bandwidth, wherein the minimum is the estimation of the available bandwidth for the pair of nodes.

13. The method of claim 11, wherein a number of source clusters and destination clusters for one node of the plurality of nodes is different from a number of source clusters and destination clusters for a second node of the plurality of nodes.

14. The method of claim 11, wherein a number of source clusters and destination clusters for each node is determined by each node.

15. The method of claim 11, wherein determining cluster heads comprises:
for each source and destination cluster, selecting a least loaded node in the cluster as the cluster head for the cluster.

16. The method of claim 11, wherein determining cluster heads comprises:
for each source and destination cluster, selecting a node with a maximal capacity as the cluster head for the cluster.

17. The method of claim 11, wherein determining the destination clusters comprises:
for each node of the plurality of nodes, determining destination paths to all other nodes of the plurality of nodes;
from the destination paths, determining paths with shared hops; and
placing nodes in a same destination cluster based on a number of shared hops in the destination paths.

18. The method of claim 11, wherein determining the source clusters comprises:
for each node of the plurality of nodes, determining source paths from all other nodes of the plurality of nodes to the node;
from source the paths, determining paths with shared hops; and
placing nodes in a same source cluster based on a number of shared hops in the source paths.

19. The method of claim 11, wherein determining the source clusters of nodes and destination clusters of nodes for the corresponding node further comprises:
dividing k among the children of the root in a same ratio as the number of leaves in each subtree to determine a portion of the k clusters assigned to each child of the root.

20. The method of claim 19, comprising:
if k is greater than one for a child of the root, then assigning a portion of k to each subtree of the child based on a number of leaves in each subtree of the child.

21. A computer system to estimate available bandwidth for a pair of nodes of a plurality of nodes in a network, wherein the pair of nodes includes a source node and a destination node, the computer system comprising:
a data storage device to store information for the pair of nodes, wherein the information includes, for each of the pair of nodes, source clusters, destination clusters, cluster heads for the source and destinations clusters; and
a processor to determine a plurality of different sets of clusters for the plurality of nodes, wherein each set of clusters is determined for a corresponding node of the plurality of nodes and each set of clusters includes source clusters of nodes and destination clusters of nodes for the corresponding node, and
to estimate an available bandwidth for the pair of nodes based on bandwidth measurements between the pair of nodes and the cluster heads,
wherein to estimate the available bandwidth, the processor is to:
determine a first available bandwidth from the source node to the cluster head of the destination cluster including the destination node;
determine a second available bandwidth from the cluster head of the source cluster including the source node to the destination node; and
determine a minimum of the first available bandwidth and the second available bandwidth, wherein the minimum is the estimation of the available bandwidth for the pair of nodes.

22. The computer system of claim 21, wherein the processor determines the plurality of different sets of clusters for the plurality of nodes by:
for each corresponding node, performing traceroutes from the node to all other nodes of the plurality of nodes to determine paths to the all other nodes, wherein the paths include intermediate routers;
determining a traceroute tree comprised of the determined paths;
determining k1 source clusters and k2 destination clusters based on a number of children from a root node in the tree and a number of leaves in subtrees for the children; and
dividing k among the children of the root in a same ratio as the number of leaves in each subtree to determine a portion of the k clusters assigned to each child of the root.

23. The computer system of claim 22 wherein if k is greater than one for a child of the root, then the processor assigns a portion of k to each subtree of the child based on a number of leaves in each subtree of the child.

* * * * *